United States Patent
Nørgaard et al.

(10) Patent No.: US 6,895,573 B2
(45) Date of Patent: May 17, 2005

(54) METHOD FOR GENERATING A WORKFLOW ON A COMPUTER, AND A COMPUTER SYSTEM ADAPTED FOR PERFORMING THE METHOD

(75) Inventors: Anders Kaare Nørgaard, Holte (DK); Lars Pedersen, Copenhagen N (DK); Peter Strøiman, Copenhagen N (DK)

(73) Assignee: ResultMaker A/S, Copenhagen V (DK)

( * ) Notice: Subject to any disclaimer, the term of this patent is extended or adjusted under 35 U.S.C. 154(b) by 568 days.

(21) Appl. No.: 09/983,875

(22) Filed: Oct. 26, 2001

(65) Prior Publication Data

US 2003/0084016 A1 May 1, 2003

(51) Int. Cl.[7] .................................................. G06F 9/44
(52) U.S. Cl. ...................... 717/100; 717/101; 717/102; 717/106; 717/110; 706/47; 706/57; 718/106
(58) Field of Search ................................. 717/100–103, 717/106, 110; 706/47, 57; 715/513; 707/103 R, 8; 703/22; 709/206; 718/101–106

(56) References Cited

U.S. PATENT DOCUMENTS

| | | | | |
|---|---|---|---|---|
| 5,517,405 | A | | 5/1996 | McAndrew et al. |
| 5,930,512 | A | * | 7/1999 | Boden et al. ............... 717/102 |
| 6,058,413 | A | * | 5/2000 | Flores et al. ................ 718/101 |
| 6,108,711 | A | | 8/2000 | Beck et al. |
| 6,243,092 | B1 | * | 6/2001 | Okita et al. .................. 345/866 |
| 6,279,009 | B1 | * | 8/2001 | Smirnov et al. ......... 707/103 R |
| 6,339,838 | B1 | * | 1/2002 | Weinman, Jr. .............. 717/104 |
| 6,405,364 | B1 | * | 6/2002 | Bowman-Amuah ......... 717/101 |
| 6,442,594 | B1 | * | 8/2002 | Ouchi ......................... 709/206 |
| 6,546,364 | B1 | * | 4/2003 | Smirnov et al. ............. 703/22 |
| 6,625,602 | B1 | * | 9/2003 | Meredith et al. .............. 707/8 |

FOREIGN PATENT DOCUMENTS

| | | |
|---|---|---|
| EP | 0 456 378 | 11/1991 |
| GB | 2 313 457 | 11/1997 |
| WO | WO 95/26003 | 9/1995 |
| WO | WO 96/02882 | 2/1996 |
| WO | WO 00/16203 | 3/2000 |

OTHER PUBLICATIONS

TITLE: Adaptive Workflow Management–An Integrated Approach and System Architecture, author: Narendra, ACM, 2000.*
TITLE: Integrated Document and Workflow Management applied to offer Processing of a Machine Tool Company, author: Morschheuser et al, ACM, 1995.*
TITLE: Tolerating Exceptions in Workflows: Unified Framework for Data and Processes, author: Borgida, ACM, 1999.*

* cited by examiner

Primary Examiner—Chameli C. Das
(74) Attorney, Agent, or Firm—Oblon, Spivak, McClelland, Maier & Neustadt, P.C.

(57) ABSTRACT

A method for generating a workflow on a computer. Assessment data, e.g. defining a need, is obtained from a user. Based thereon, a workflow including a logical sequence of interdependent steps to be made is created using an assessment system. A number of workflow steps are presented to the user in a logical order, and results from the progress of one or more steps may be gathered. The workflow may be modified thereon, if needed, using sub-solutions, logic rules, inference rules and said results by adding and/or removing steps to/from said workflow based on a list of purposes and knowledge of the order in which some or all steps must be made. After modifying the workflow, the presentation thereof is started by the next or more unfinished steps which are not dependent on an unfinished step, thereby forming an adaptive procedure.

23 Claims, 14 Drawing Sheets

METHOD FOR GENERATING A WORKFLOW ON A COMPUTER, AND A COMPUTER SYSTEM ADAPTED FOR PERFORMING THE METHOD

BACKGROUND ART

The invention relates to a method of generating a workflow on a computer for guiding a user through a sequence of activities.

The widespread deployment of the Internet has created a situation in which intelligent systems can be accessed from outside a company or organization hosting it. Intelligent systems have been used to a certain extent to substitute the personal assistance and services of humans (e.g. experts). But the fact that this use may now extend more widely, by use of the Internet, and the fact that intelligent systems have advanced in reach, now open more opportunities for substituting human experts by assisting users through to solutions to problems or to results that match a need on a self-service basis.

In order to do so in a generic fashion, it is necessary to deploy a method and a system, which can interactively guide the user through a number of activities, where these activities continuously match the situation and knowledge of the user, such that these activities lead to the desired result or solution. Furthermore it is necessary to provide for a way of working, which is usually employed by a human expert when interacting with the user, such that it allows the user to learn more about his situation and needs as he proceeds with the activities. Therefore it is necessary to support a "trial-and-error" way of working with support for change requests etc.

Finally it is desirable to reap a number of benefits provided by a system, which cannot be delivered by a human. One of these benefits is the fact that a system can set up another system (the "result" or "solution") instantaneously, provided this other system is managed by a computer and accessible via a network (such as the Internet). A human expert would typically have to key in data in order to perform the same job, something that is very time consuming. Another of these benefits is the fact that a system can keep track of infinite amounts of details, whereas humans have limited storing capabilities in their consciousness and often have to compensate by imposing rigid structures on the process that leads to the result or solution.

Any activities, methods or problem solutions, more broadly known just as tasks, may be broken down into a set of smaller, less complicated steps, either with a logical execution order, because some steps have to be completed before one or more other steps, or without a logical execution order, because the steps are not dependent on other steps. It has then been a matter of the skill-level of the user how this was done. A user with vast knowledge of the activities and with suitable experience is able to navigate through the activities in an intuitive way (the human expert), by doing the necessary steps (and these only) in, what his experience tells him, is the best possible sequence. A user with little or no knowledge or experience, is forced to use specified steps, e.g. in the form of a checklist or procedure (perhaps put down by the human expert previously mentioned) in a specific sequence, possibly without any understanding why this has to be done in this fashion. The human expert, who designs the procedure putting down the specified steps, because he has no specific knowledge of the specific situation of the user, is forced to include possibly unnecessary or possibly redundant steps to take care of any eventualities. For smaller activities this is perhaps the best way, because a limited number of variables, gives a limited number of steps and interconnections between the steps, and thereby a procedure with limited complexity. However, as the activities increase in size, the number of steps and number of interconnections increase, making it more and more possible that something is missing, misleading or wrong. Furthermore, as the activities increase in size, it becomes possible/desirable that more than a single person is working on it, either because the activities require more than one person, or because the activities are completed more quickly.

Because a human expert will not always be accessible or in order to provide faster and instant access via the Internet and/or because the activities broken down into single steps with dependencies may become vast and complicated, a computer system emulating the function of the expert is possibly not only a sub-optimal and cheaper solution, in some cases it will actually be the optimal solution (in addition to being the cheapest solution). This is because it becomes difficult for the human expert to coordinate a vast number of interdependent steps, especially if more than one person is working on the activities at the same time, or if many details of the process activities creates a vast number of variants of the activities.

Many methods exist for organising activities. Among these, two are of special interest. They are workflow-managers and expert systems.

A workflow-manager works by getting information on the activities (and possibly a combination of these), the steps involved and their interconnections and then setting up the individual steps. The workflow manager then is used to distribute the workload and ensure that no step is initiated before all steps it depends on are completed. The workflow-manager is used to coordinate the available resources. The workflow-manager sets up the individual steps in a logical sequence, ensuring that if step A has to be completed before step B, it will take this into account while allowing not interconnected steps that do not depend on each other to be completed in any sequence desired by the user. It is of course also possible for the workflow-manager to include several steps to be the interdependence of a step (such that both A, B and C need to be completed before step D).

Expert systems are useful in many areas. Among these are the ability to apparently emulate an intelligent approach to solve a problem. In thise use the expert system works by taking a number of inputs (the symptoms) describing the problem or need or attributes of a desired task and goal as an input describing the problem at hand. The expert system then consults a database of sub-solutions, logic rules, inference rules to guide the dialogue with the user and formulates a solution (the cure) that involves some set of activities to complete, typically formulated as a text or composite set of data, possibly outlining a workflow, all of which is however static, once the solution is devised.

The underlying problem of using a workflow manager or an expert system to emulate the human expert is that the human expert does not work from a pre-arranged sequence of steps as with the workflow-manager, neither does he formulate a static cure based on the symptoms polled once as the expert system. The human expert may have a workflow planned, based on the initial information, but he continues to modify the workflow based on the progress of his work. This may include adding or removing steps as he discovers that they become necessary or unnecessary, modifying the interconnections of the steps and possibly having to redo already completed steps based on information from later steps and having to change the cure as more information and experience becomes available.

BRIEF DESCRIPTIONS OF THE INVENTION

It is an object of the invention to provide a user with a tool whereby a sequence of steps comprising an activity may be structured and coordinated in an intelligent way, where the basis upon which the structure and coordination are made may change, where the structure and coordination adapt according to the change and where the initiation of the change is caused by an outside intervention or from results of one or more of the steps comprising the activity.

According to the invention, the object is achieved by a method of generating a workflow for guiding a user through a sequence of activities, said method comprising the steps of:

obtaining assessment data from the user, said assessment data defining a need, problem, state, or desired change of state, creating a workflow based on said assessment data using an assessment system, said workflow describing a logical sequence of interdependent steps to be performed to complete said task, each step having a start and a finish, which may be coincidental, and presenting said user for one or more of said workflow steps in a logical order, wherein said workflow is modified by:

gathering results from the progress of each of said one or more steps, modifying, if needed, the structure of said workflow using said assessment system, sub-solutions, logic rules, inference rules and said results by adding and/or removing steps to/from said workflow based on a list of purposes and knowledge of the order in which some or all steps must be executed, and continuing through said workflow starting the next one or more unfinished steps which are not dependent on an unfinished step, thereby forming an adaptive procedure.

The invention is based on the fact that a human expert may be emulated by a combination of a workflow-manager adapted to keep track of the progress of the activities and an expert system adapted to get to a result that matches the need of the user or leads to a solution to the activities.

By integrating the expert system or assessment system with the workflow-manager the system emulates the process of human expert advice and guidance. The system manages the logical sequence of the activities of the workflow, such that (as with other workflow-managers) the activities are not carried out in a wrongful sequence, and (unlike other workflow-managers) that the user may change the workflow as he proceeds through it including activities he already has completed by adding to, removing from, or re-setting activities (changing their state from "finished" or completed to "not started") in the workflow. These changes and alterations of the workflow are based on knowledge and conclusions from the assessment system combined with knowledge of interconnections in the form of purposes for the steps, thereby more closely emulating a human expert. The system will manage which of the already completed activities needs to be reset (i.e. re-done/up-dated), if, as a consequence of the change, a logical predecessor has been added or reset, which is a prerequisite for carrying out the activity. Furthermore all past conclusions are listed by the system, and by allowing the user to selectively change any of them, the system executes the above updates to the workflow and keeps track of what needs be added or re-done in order to comply with the new set of conclusions, while leaving completed all the steps that are not affected by the change in conclusions. Thereby the system emulates a "trial-and-error" work fashion, where the user freely changes past conclusions of the assessment system with minimum waste of effort, and it enables the user to arrive at his goal with a limited initial knowledge of the actions involved. The system therefore has the grand overview over the entire work-process, and at the same time the system does not loose track of the interdependencies.

All the activities which comprise the working area of the advice and guidance system are broken down into smaller elements, consisting of a single step, an interview or data collection activity to be handled by the assessment system, a contained procedure (running a script or an application) based on some initial information such as answers to or conclusions from the interviews or data collection of the assessment system, or any other activity which has to be done, but which has no other influence on other elements other than the completion of the activity itself and possibly some results. Each of the elements may have a set of pre-requisite elements, each of which has to be either completed before the element is initiated (a sequence predecessor) or which is a logical predecessor to the element. A logical predecessor requires all elements having it as such a logical predecessor, to be reset and carried out again, if the logical predecessor is reset.

From the interview with the user or from any other activity giving information on the activities to be done, the assessment system draws a conclusion on which elements to add, remove or reset, based on the interconnections between conclusions and the elements in the form of purposes as described below. When adding and/or resetting elements, the system checks whether elements exist, which need be reset from completed to not started for the reason that one or more of their logical predecessors are now reset (or an element has been added, which is now a logical predecessor).

Each of the elements has one or more purposes attached and an inclusion rule associated with the purposes. The steps of the workflow are then included in the workflow based on a list of active purposes. The assessment system activates/deactivates purposes and resets purposes. The inclusion rule in its simplest form is a simple "OR" rule, such that the rule becomes: "if at least one of the purposes of an element is active, then the element must be included in (i.e. added to) the workflow. More complex rules make up a logical (Boolean) formula that combines the purposes to a Boolean type of expression where results are being "included" or "excluded". Thereby the assessment system indirectly includes and excludes the elements by managing a list of active purposes. Similarly it may reset all elements with a particular purpose by resetting the purpose. (Reset rules may apply here as well to compute when an element needs be reset; in its simplest form this reset rule is an "OR" rule, such that the element is reset, if any of its purposes is reset). Resetting means that if the element was "initiated" or "finished/completed", its state is changed into being "not started".

The workflow elements (activities or groupings of activities) are all indexed with one or more purposes and an inclusion rule for the elements is applied, e.g. the rule that states that the element is included if at least one of its purposes is included. The assessment system produces conclusions from the online interviews, and each conclusion resulting in each of the purposes to be, either, included in the list of active purposes, excluded, or reset. Applying the inclusion and exclusion determines which purposes are included in the list of active purposes (and thereby which elements) are included in the workflow, and applying the reset has the effect to change the status of elements either in progress or completed to a not started status.

The workflow-manager manages a set of sequence predecessors (determining bounds on the sequence of execution) and a set of logical predecessors (determining which elements are pre-requisites of others), such that if an unfinished element is added, which is not completed, or if a finished or initiated element is reset, then if this element is a logical predecessor to another element (initiated or completed), this other element and all the elements in the logical sequence (i.e. further elements to which the other element is a logical predecessor) are all reset (i.e. status changed from completed to not started but is not necessarily cleared of all information).

The method according to the invention then works by designing a combination of action data and assessment inference data. The action data maps out the complete set of workflow activities, including all variants, as they may appear due to different combinations of active purposes, and comprise elements of activities broken down to simple steps, each having one or more purposes attached, each having from zero to any number of sequence and logical predecessors, each potentially containing a reference to a contained procedure or to an assessment (interview or data collection to be carried out, at the point in the workflow represented by the element). The assessment inference data comprises inference rules and conclusions as well as interconnections between conclusions and purposes to be added, removed, or reset, and parameter values to be stored for later reference.

The user starts the workflow, and the system progresses as mapped out in the action data, whereby it reaches to an element with a reference to an assessment, whence the assessment system starts obtaining assessment data from the user: The assessment data defining some sets of information, depending on the activities. These sets of information comprise problem information, need information, system status information, and system change information. System status information is information on the errors of a system, symptom information for the errors of a system, information on a previous change of the configuration of a system, lists of previous actions or information on system maintenance schedules. System change information is information on desired additions to a system, information on desired subtractions from a system and information on desired change of configurations. Problem information is information on a problem to be solved, information on possible causes of the problem, information on previous actions to correct the problem. Need information is information on a need to be fulfilled, information on possible desired future states and goals, information on previous actions to fulfil the need. The problem information, need information, status information or change information form together the assessment data which outlines the activities. The assessment data information is obtained from the user or system maintenance schedule, system manager, from a person, group, organization, instrument, apparatus or any other amalgam of persons, machines or instruments who hereafter simply will be referred to as the users. The information from the users may come in the form of a text-file, an error-log, a selection from a set of possible options, in the form of an interview or from any other method giving information on the assessment data. The assessment inference data is used to (1) guide the process of obtaining assessment data as well as (2) to come to conclusions and to compute parameters and identify purposes to include, exclude, or reset. When finishing the assessment, the parameters, active purposes and resetting of purposes are completed, and the handle passed back to the workflow-manager, which, before continuing with the next step, checks all logical predecessors and resets elements with unfinished logical predecessors as described above.

Especially, when many people work on the activities, but also when only a single person works on the activities, information from one step may cause a significant change in the workflow. An example would be the building of a house. If at a time when the walls were finished and preparations to put up the roof were started, it was discovered that the mortar used for the walls were bad in some way, it would require a significant change in the workflow to compensate. The activity "building walls" would change from finished (i.e. completed) to unfinished and as a consequence it would have to be carried out again.

As mentioned above, according to the invention a workflow is generated, the workflow comprising the task as it appears before the task is started, and where the workflow is generated according to information on the task. The information comprises an outline of the task to be done, where the information may be the definition of a need, a problem to be solved or the state or desired state of something. An assessment system takes the gathered information and forms a workflow. The workflow is comprised by steps, where the steps are arranged so that they are done in a proper and not wrongful order. Each of the steps of the workflow is managed by a workflow-manager, and the workflow-manager may also be used to present the workflow to the user. A step of the workflow is also characterised by having a start and a finish, but because the work comprising the step may be minor, the start and finish may be coincidental or nearly coincidental. The progress of a step may produce some results and these are used by the assessment system to assess if the workflow is sufficient to finish the task and if not, use this information together with additional information to change the workflow. It may be that the change in the workflow includes new steps logically before already finished steps. The workflow-manager then indicates that the next steps to be carried out, are any steps, which have no unfinished steps earlier in the sequence of the workflow. The interaction between the workflow-manager and the assessment system is what creates an adaptive workflow-manager.

If a system employing the above mentioned method is installed on a server connected to the Internet or another computer network, it will act as an Online Consultant service, where a plurality of users may connect to the server and employing the server as a guide.

The method according to the invention is superior to methods of the prior art as it enables a user to perform tasks very efficiently as the workflow presented to the user describes the sequence of activities to be performed. Hereby, the user may solve even very complicated tasks both time and cost efficiently. Further, as the user is guided on the run, i.e. the guidance is dynamic as changes may be made to the workflow depending on the present situation and therefore continually matches the present situation, the task is solved in a failsafe manner.

According to a first preferred embodiment of a method according to the invention, the workflow and conclusions of the assessment system are displayed and where the user may add/remove steps or sequences of steps to/from the workflow by re-iterating assessments, thus allowing the user to investigate the consequences of these changes or allowing the user to update the task, thereby forming an iterative procedure. Hereby, the user is giving the opportunity to investigate consequences of changing assessment data. This is useful, because the user may not always know exactly his needs, the exact problem etc. This allows the user to investigate what is required in order to carry out a task, even when the full task is not known. It is this part of the invention that creates an iterative procedure and allows the user to learn on the fly and to work towards a final workflow, comprising what is known to him to be needed together with the information of the method on additional steps.

According to another preferred embodiment according to the invention, additional problem information, need information, status information, and change information is gathered in the form of additional assessment data specific to each of the said one or more steps of said workflow, which were not required to set up said workflow initially. For many steps of the workflow it is not always necessary to know all required information in order to carry out a step of the workflow, when the workflow is constructed. Hereby, the initial information for setting up the workflow becomes less comprehensive. Later when the step is executed, additional information may be provided in order to carry out the step.

Further, according to a preferred embodiment according to the invention said steps of the modified intermediate workflow already finished, may be marked as unfinished or not started due to the update of the workflow, because they depend on unfinished steps, which have been included in the workflow or reset as a part of said modification. Hereby, it is ensured that the step is completed correctly under the new changed circumstances. This is useful because the number of steps on which a step is dependent and the nature of these steps may have significant consequences for the execution of the steps.

Further, according to a preferred embodiment according to the invention wherein one or more steps of the workflow is changed from finished to unfinished, where the information contained in the steps either are cleared or at least a portion is reused. In this way, some or all of the work done in a previous execution of the step may be reclaimed, thus speeding up the progress of the changed workflow. It will, however, often be necessary to verify some or all of the information.

According to a preferred embodiment, a step removed by a previous modification of said workflow and later added again by a new modification may retain some or all information already gathered for that step, and possibly keeping the step in the state in which it was at the time of said removal (e.g. started or finished). Hence, the execution of the workflow is speeded up, because already finished work is reclaimed. It will, however, often be necessary to verify some or all of the information.

According to a preferred embodiment, said steps of said workflow are only in the form of questions and said results are only in the form of answers, where the structure of said workflow is modified using said assessment system based on said answers and where the method becomes an interactive questionnaire and the result from going through all said steps of said workflow outlines a need for a product or service. Hereby, the method works as a system defining a need. When the user answers the questions, the assessment system puts up the workflow as above, but none of the steps of the workflow are executed. The user now has a workflow outlining the activity, with information on the individual steps. This may then be used to form a basis for the decision whether or not the activity should be engaged and provide the user with arguments for or against it.

According to a preferred embodiment, a step of said workflow may be marked as finished or unfinished depending on the time at which one or more steps are started or finished or simply by the distance in time to one or more times and/or dates. Hence, it becomes possible to model aspects of the coordination of steps, like when one or more first steps are started or finished other one or more second steps have to be started within a certain time limit, otherwise the one or more first steps have to be made again.

According to a preferred embodiment, said workflow may be modified depending on the time at which one or more steps are started or finished or simply by the distance in time to one or more time and/or date. Hence, if one or more steps are not finished on time, a large restructuring of the workflow may be required. If one or more steps are completed early, it may be beneficial to the speed with which the workflow may be finished and the workflow is changed accordingly. Likewise, if one or more steps are late, it may require a restructuring to cope with this.

According to a preferred embodiment, a step of said workflow has or requires resources comprising personnel, equipment, time, money, space, knowledge and other which may be swapped between one step and another, depending on the status of said one or more steps. Hereby, if a step of the workflow has allocated or requires resources like manpower, equipment and the like, these resources may be swapped between one or more steps. In this way, a rule may exist, where a step is lagging behind or advancing too quickly, its resources are used helping the other steps, thus minimizing idle time.

According to a preferred embodiment, a step of said workflow cannot, if required, be started and/or finished until a sworn statement of cohabitation accepting or approving said results of said step, creating an electronic signature or any other method for approving or accepting an action has been performed and the results are as stated. This gives two advantages. Firstly, only certain persons may start a step. This is just like in a workstation, only the person with the root-password may work on the configuration of the system. Secondly, when a person gives a signature, accepting that the step is finished, it is known who this person was and who has the responsibility for the step not being finished or finished correctly.

According to a preferred embodiment, a step of said workflow may involve a purchase of a product, service or manpower. This is useful, if, e.g. the task in question is the setup of a server and it involves a third party software. The step is then simply to acquire this software, either from a shop or download it and pay for it. This is advantageous because everything does not have to be supplied from the same place.

According to a preferred embodiment, said user is accepting a specific product, company or service to interact with his local configuration and programs and thereby enabling the combination of the workflow-manager and assessment system to work as an automated maintenance system doing changes in configuration and installing/de-installing programs. Thus, the company or service may always go to the system and make changes to the system, without having to ask for approval of every step that has to be taken. The company or service may thereby perform running maintenance.

The invention also relates to a computer system for generating a workflow and comprising:
   one or more data files containing assessment data outlining a problem to be solved or a need to be fulfilled, a database containing data on one or more solutions or methods to a vast number of smaller tasks within a specific defined technical field, a workflow-manager capable of keeping track of steps comprising an activity and ensuring that the steps are carried out in a not wrongful order and where more than one step may be in progress at the same time, and an assessment system capable of creating one or more data files containing a work flow based on said data file, using said database, wherein said one or more data files containing said workflow are modified by the assessment system, said workflow-manager is keeping track of said steps outlined in said one or more data files outlining said workflow, the progress of said steps of said one or more data files outlining said workflow is monitored and one or more data files containing data on said progress of said workflow and results from said progress of said workflow are created or updated, and said assessment system using said one or more data files outlining said progress and said results from the workflow is modifying said one or more data files containing the workflow using sub-solutions, logic rules and inference rules. Hence, the adaptive nature of the system arises from the interaction between the workflow-manager, the assessment system and the information gathered from the progress of the workflow, and thus the system becomes adaptive and capable of coping with changes in task at hand.

In a preferred embodiment according to the invention, the workflow-manager and assessment system are installed on a first server. Preferably, said first server is also connected to the Internet or any other interconnected computer network, wired or wireless. Hereby, the system is accessible from the outside, thus allowing for a much more effective use of the system, where several different users are engaging the system one by one or all at the same time.

The claims 14 to 23 describe one suitable embodiment a system according to the invention, but many such embodiments are possible, while remaining within the scope of the invention. As shown on FIG. 3, there is a firewall between the second server and the Internet and the user communicates with the second server via a CITRIX server. It is possible to use another protection scheme than a firewall, and in the same way it may be possible to use something other than a CITRIX server between the user and the second server. It is of course also possible to do without the Internet, firewalls and CITRIX server. It is further possible to have a third server running on the user's computer and thus provide an interface between the system according to the invention and another application, where the user of this other application is providing information in a different format or where some or most in formation is inherent.

TECHNICAL FIELD

Whereas the above-described system may be used as an installed adviser and/or guidance system on a personal computer, a workstation or other system comprising microcomputers, the main use of the system is as an advice and guidance over the Internet or other interconnected computer network, wired or wireless.

Workflow-managers, which are used to manage document or information flow such as approvals, catalogues, manuals, time schedules, budgets or resource handling.

Project management systems, used together with "virtual project" portals to facilitate distance cooperation and common plans.

Product configurators, which interview users via the Internet and suggest products in groups or configure the product either by presenting a number of steps to complete and reporting the results or accessing the system and do the configuration for the user automatically.

Online knowledge handling, like KnExA which auctions files submitted by "knowledge holders" and others.

Wizards, which guide through e.g. software installation and smaller configuration tasks.

Expert systems, which are able to diagnose a problem based on interviews (similar to product configurators which find results that match a need).

Project plan creator tools used by management consulting houses etc. to help their consultants develop project plans to suit a certain purpose or goal of a project.

Remote diagnostics of faulty systems or configurations.

ASP model, where the user creates a result (the instance of his application) via the Internet.

BRIEF DESCRIPTION OF THE DRAWINGS

In the following the invention is described with reference to the figures of the accompanying drawings, wherein.

BEST MODE FOR CARRYING OUT THE INVENTION

The invention relates to a system and a method of using an expert system (assessment system) working together with a workflow-manager and thereby emulating how a human expert would manage a task. The user is through an interview asked questions by the assessment system where the questions outline the task at hand as it appears before anything has been done. The assessment system and the workflow-manager are then used to construct a workflow suited to fulfill the task. The workflow-manager comprises a database of sub-solutions within a technical field suited for the task. In the sub-solutions in the database it further comprises steps, where the steps are assigned purposes, i.e. a set of rules for including or excluding one or more steps. The steps of the database are also assigned interdependencies, i.e. a knowledge of a proper sequence by which the steps must be carried out, or bounds on the allowed sequences. Using this database and knowledge of the task at hand, the assessment system and workflow-manager construct a workflow comprising the steps necessary to complete the task at hand. The purposes tell which steps to include and the interdependencies tell in which order they must be made. The workflow-manager then takes the work-flow constructed by the assessment system consisting of one or more individual steps, and manages the execution of the individual steps, ensuring that the steps are made in a not wrongful sequence. As the workflow progresses, the assessment system assesses results from the steps of the workflow. This assessment may result in two things, either that the workflow as it appears is adequate to complete the task at hand or that something from the progress of the workflow indicates that the workflow cannot fulfill the task at hand. In case of the latter, the assessment system changes the workflow based on a combination of the information of the progress of the workflow and additional information from, e.g. a new interview or on other means for obtaining information. The updated workflow may be significantly different from the previous one with steps having been added or removed and already completed steps may have to be remade or at least verified. In this way the advancement through the workflow and the update of the workflow creates a dynamic workflow capable of coping with a changing environment.

Figure 1:
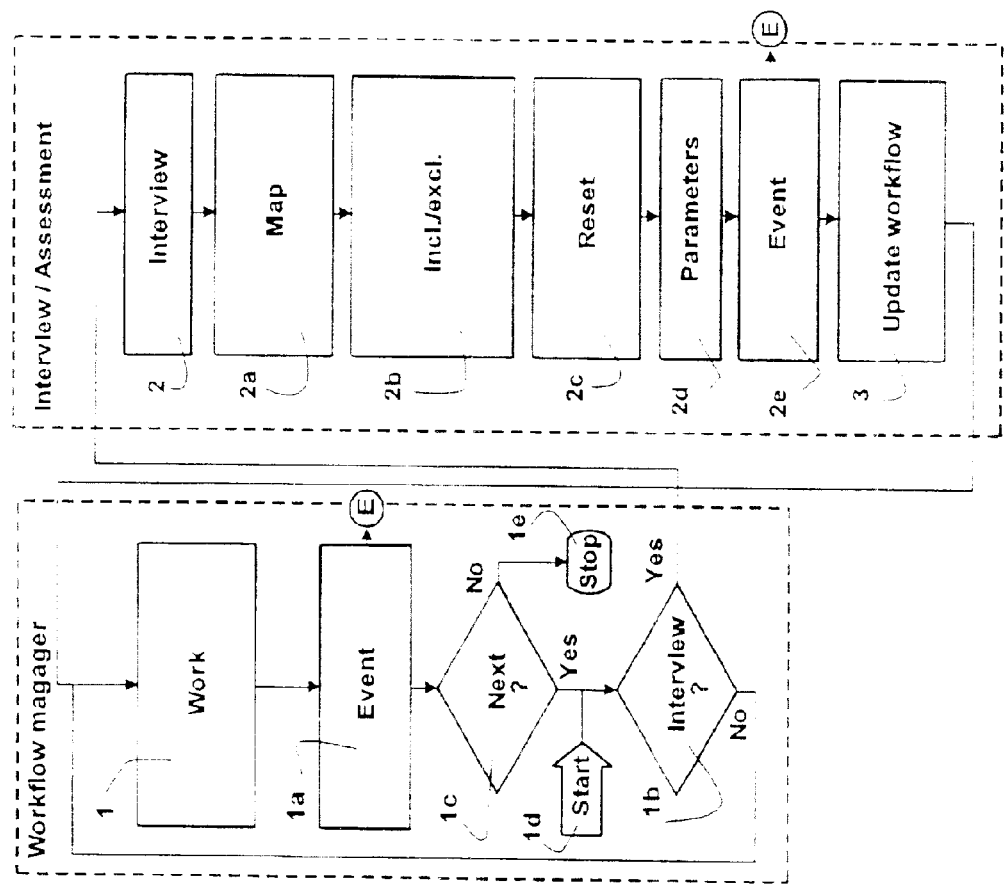
FIG. 1 shows a flow diagram of the process of running the online consultant.

The core of the invention is the interaction between the workflow manager and the expert system. This interaction is shown in FIG. 1 as a flowchart, where on the left-hand side is the workflow manager and on the right-hand side is the assessment system. The flowchart starts at the start arrow (1d). Depending on the circumstances, workflow may already exist, because the task is partially known or no workflow at all exist, except for the step, which holds an interview. Each step may or may not contain an interview, and if it does (decided in 1b), it is marked by making a reference from the step to the interview using a unique identifier, thereby telling the assessment system which interview to carry out.

If an interview is not required, the next one or more steps of the workflow (1) are initiated. The one or more steps of the workflow may trigger one or more events (1a). An event triggers a contained routine, that runs independently of the workflow and the progress through the workflow does not wait for the event to finish. An event is discussed in detail below. After the one or more events, it is checked whether or not any steps of the workflow are unfinished or whether an update of the workflow is needed. If not, the flowchart simply stops (1e). If there are any unfinished steps or if the workflow needs to be updated, the flowchart returns to the decision whether an interview (1b) is needed or not.

If an interview is needed, the assessment system is engaged. The assessment system starts with an interview (2) consisting of one or more different ways of obtaining information, either as a direct dialogue with the user or by engaging in information-gathering routines, e.g. running scripts on a remote system, receiving error-logs and configuration information and many other routines. The assessment stops when adequate information is obtained. The conclusions from the assessment are then mapped to the list of active purposes (2a) and all steps which had one or more of their assigned purposes added are included in the workflow (2b), if they are not already a part of it. If a step no longer has any of its assigned purposes included in the list of active purposes, it is excluded from the workflow (2b). The rules by which steps are added may be simple Boolean AND/OR logic rules using the list of active purposes or they may be more complex rules using the list of active purposes together with a database of sub-solutions, logic rules and inference rules. After the steps have been added or removed (2b), all steps, which have had a step added being a predecessor to that step, are reset (2c), i.e. marked as not started. After the reset of the steps, the parameters from the assessment (the parameters include answers and conclusions, which are selected to become parameters, and so are available for later assessments and scripts) are written (2d) and an event is generated (2e) signifying that the assessment has finished (this event being named "OnInterviewFinished"). When the interview is finished and passes on the control to the workflow manager, the workflow-manager immediately checks all predecessors (3) and resets all steps with unfinished steps as predecessors. The flowchart then returns to the workflow-manager.

As mentioned above, the flowchart occasionally triggers an event (1a, 2e). The event (1a, 2e) is the interaction with all components that are not a part of the workflow manager or the assessment system, but is initiated by them. As a part of the event scripts are executed (4). The scripts describe some actions to be taken. A script should not be understood in a limited sense, as it might simply contain a list of things to undertake or rather a complex procedure for carrying a number of things out in an ordered sequence like the scripts used in some computer programs for, e.g. setting up an application in a desired state. When the scripts are executed they may communicate via the Internet using a procedure like Call URL (Uniform Resource Locator—an Internet address) (4a), but any such method may be used. In the FIGS. 4, 5, 6 and 7 an HTTP module is used to communicate to and from the scripts, but any transfer protocol may be used. The communication may also return information, which may be needed to update the workflow. When the script is finished the event is closed (4b) and the closure of the event may possibly cause the workflow to be updated, but because the flowchart does not wait for the event to finish, the workflow may not be updated exactly when the event closes.

Figure 3:
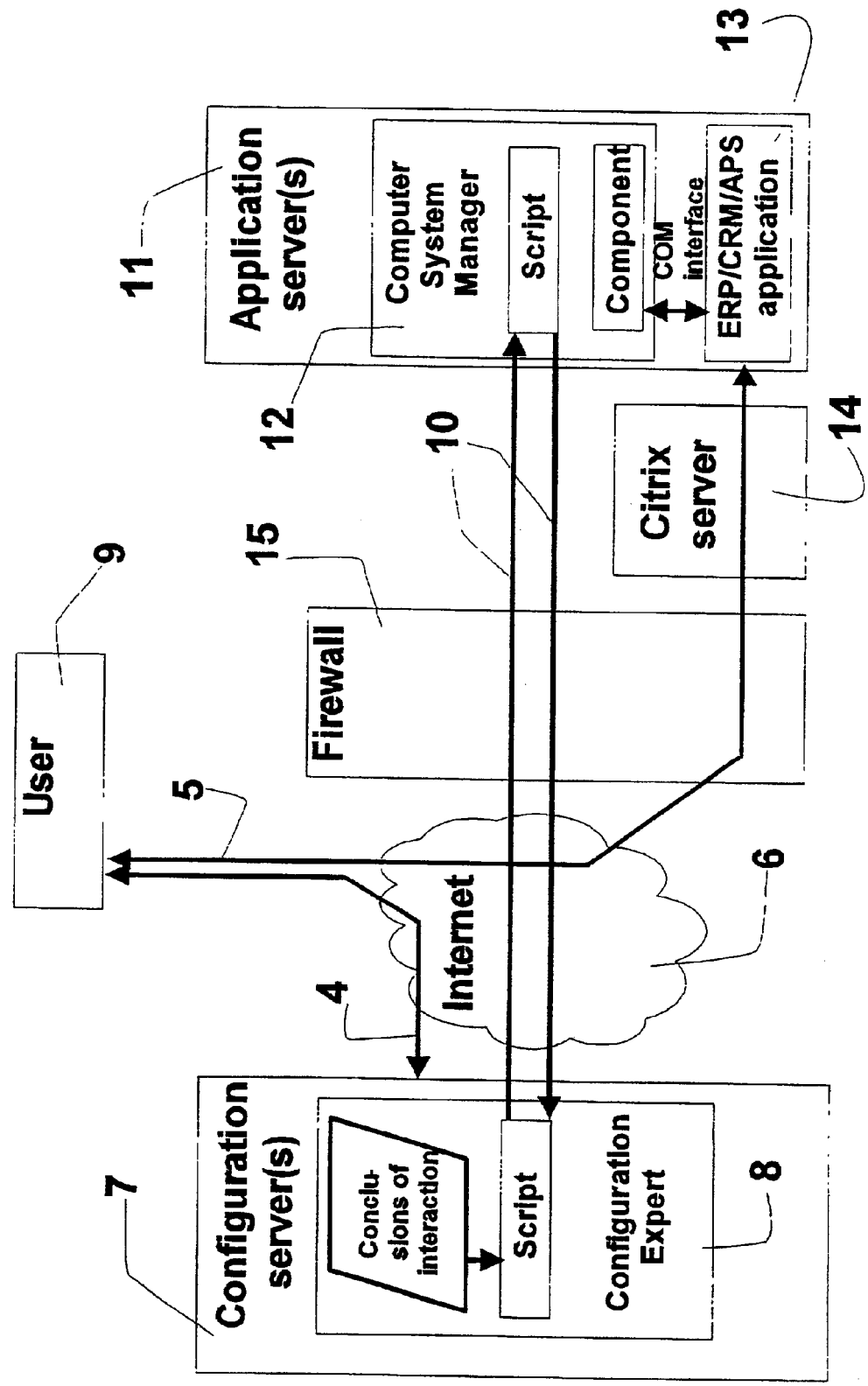
FIG. 3 shows how the different components of the system connect through the Internet.

The shown system in FIG. 3 comprises a first server, which is a configuration server (7), a second server, which is an application server (11) and a user (9). The use of the invention in the example is as a configuration expert (8) and is installed on said first server (7). Said second server (11) in the example comprises a computer system manager (12) and the application (13) in question. The application (13) installed on said second server (11) may be many things like Enterprise Resource Planning (ERP), Customer Relationship Management (CRM), Advanced Planning and Scheduling (APS) and others. Said first server (7), said second server (11) and the user (9) communicate in the example via the Internet (6), but could just as well communicate via any computer network wired or wireless. As shown in FIG. 3, a firewall (15) may be inserted between said second server (11) and the Internet, but this is not vital to the invention. The communication (4) between the user (9) and said first server (7) may be performed in many different ways, such as a special program written for the purpose installed on the user's computer or by using a common protocol used on the Internet (6) like HTTP and using an Internet browser. Said first server (7) and said second server (11) exchange information via calls between scripts, transmitted (10) via the Internet (6). The user (9) may also communicate (5) with said second server (11). This may also be done in several different ways. In the example in FIG. 3 this is done via a Citrix server (14) and an Internet browser, but could just as well be done directly by a specific program written and installed on the user's computer. It is obvious to the person skilled in the art that many different variations on the system shown in FIG. 3 are possible while remaining within the scope of the invention.

FIGS. 4, 5, 6, 7 and 8 show the different components of the invention and how they interact. In the figures, if a box has a notch in the upper left corner, it means that the box represents data, otherwise the boxes represent a process of doing something.

Figure 4:
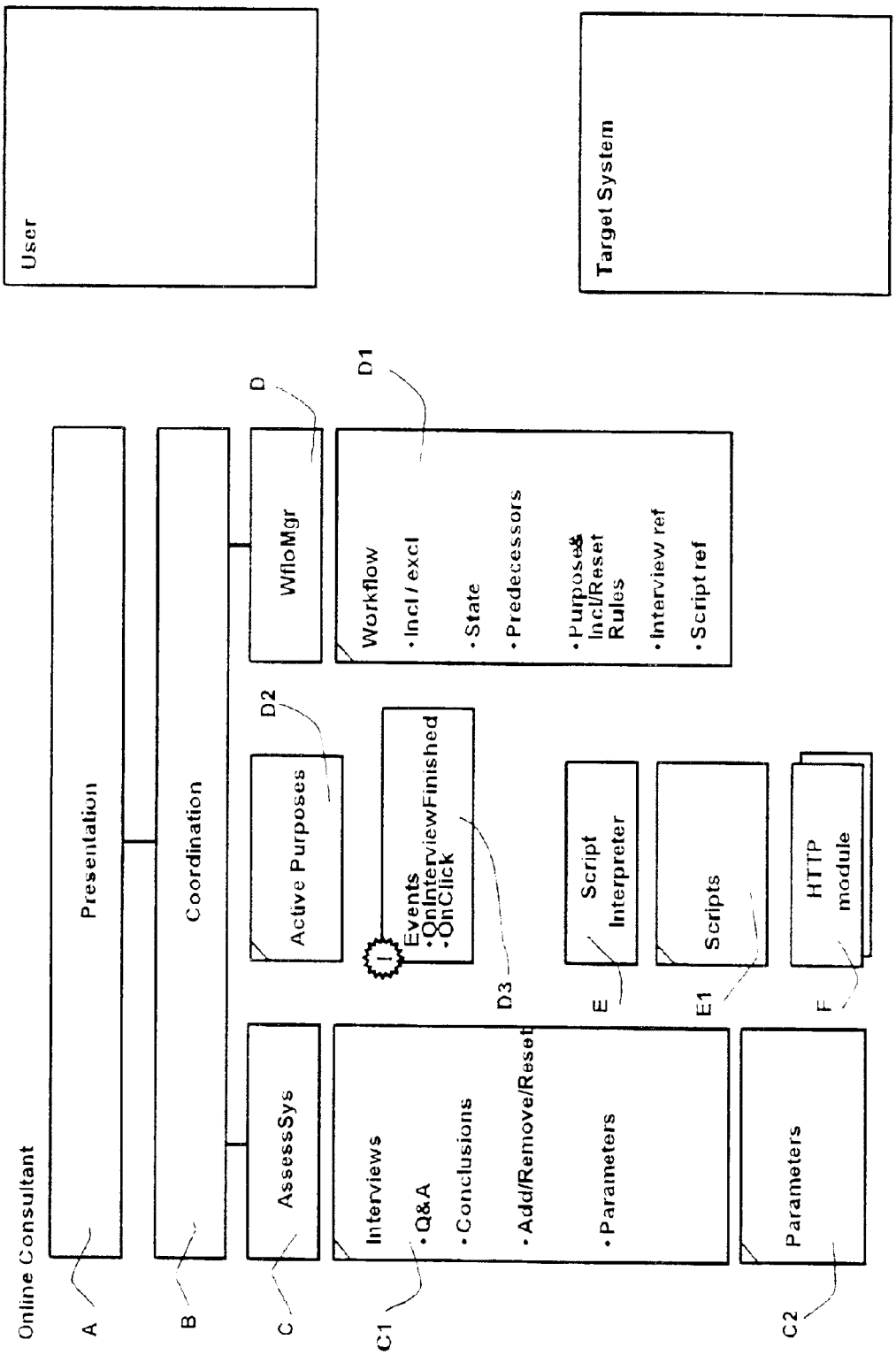
FIG. 4 shows the online consultant as different components of a system.

FIG. 4 just shows the components without any interaction. The presentation block (A) is the part of the program, which communicates with the user. In a preferred embodiment of the invention, it does so via the Internet. The Presentation block then accesses the functionality of the invention by calling function and procedures in the coordination block (B). It may do so via a local interface, or via the Internet using an XML based definition of the interface, in which case the presentation block is installed on a third server.

The Coordination block coordinates the interaction between the assessment system (C) and the workflow-manager (D), and it manages the execution of scripts, carried out by the scripts interpreter (E).

The scripts interpreter may make use of other modules of code such as an HTTP module (F) for the case where a script needs to communicate with another system via the Internet.

The data of the assessment system (the assessment inference data) and the assessment data are the Interviews (C1) and the Parameters (C2). The data of the workflow-manager (the action data) are the workflow database (D1) (also referenced as the database of sub-solutions), the list of active purposes (D2) and the list of events (D3). The data of the script interpreter are the scripts themselves represented as code, (E1).

Figure 2:
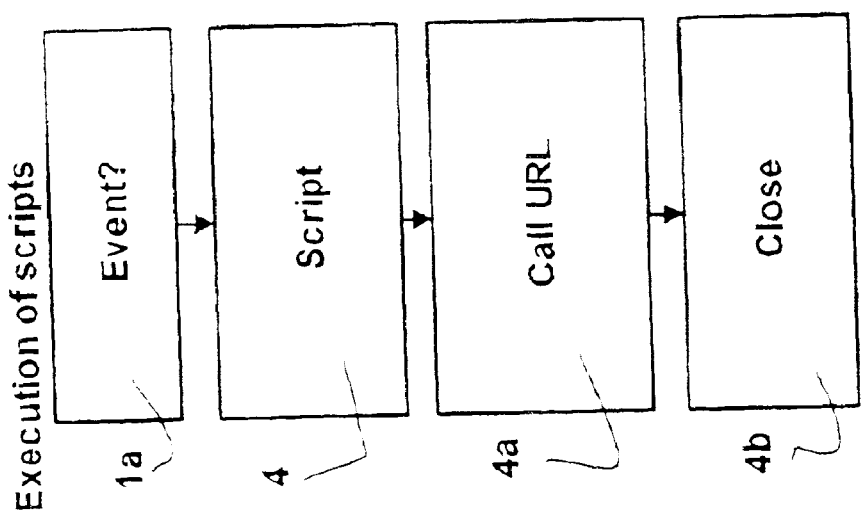
FIG. 2 shows how an event is managed.

In the following FIGS. 5 to 8, interaction between the different components of the invention is shown as broken arrows going straight between the components in question, where in reality the interaction often goes through the Coordination block (B). The numbers shown in FIGS. 5 through 8 refer to the steps described in FIGS. 1 and 2.

Figure 5:
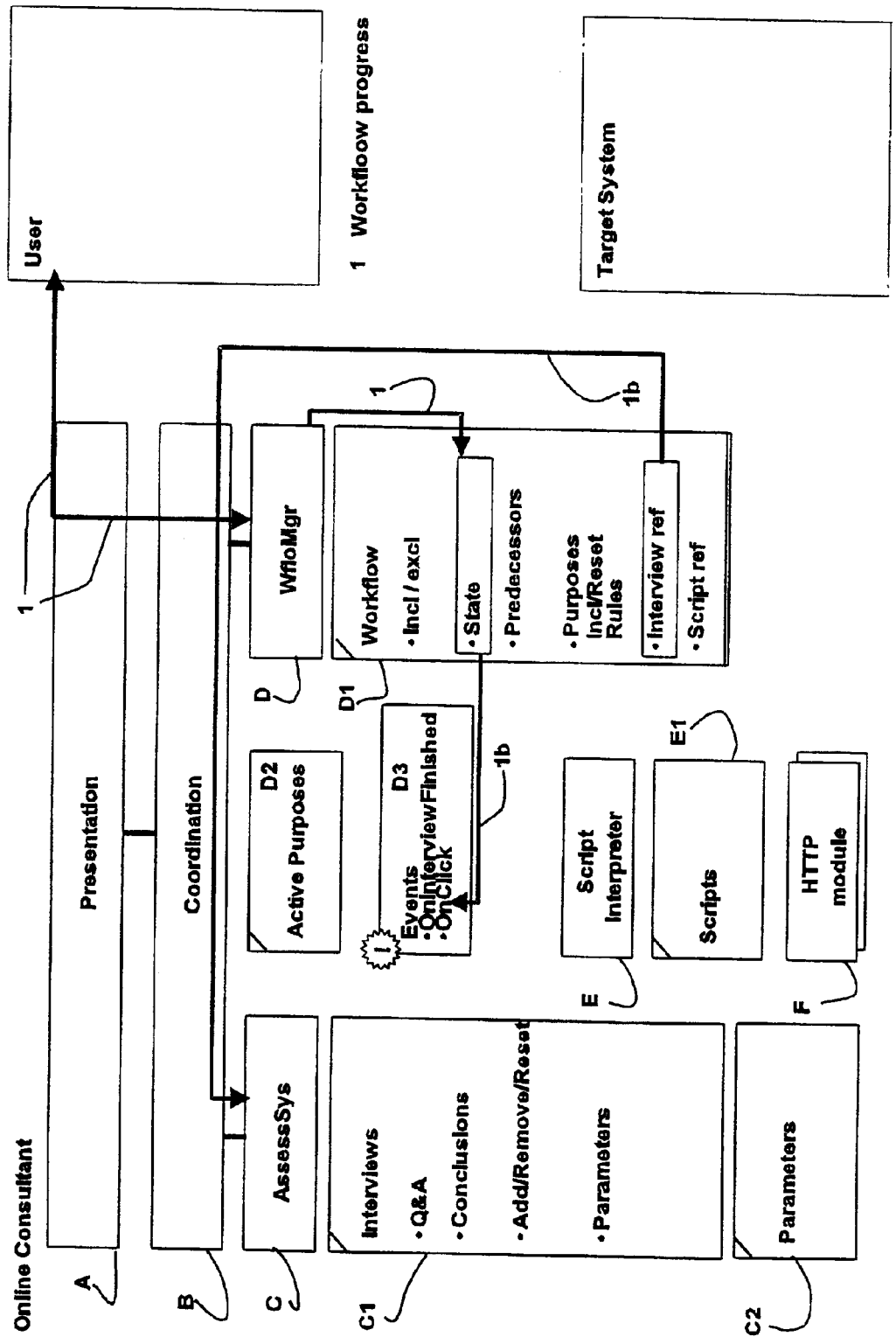
FIG. 5 shows the workflow-manager component of the system.

FIG. 5 shows how the workflow manager progresses through the workflow, corresponding to the steps (1), (1a) and (1b) of FIG. 1. Carrying out work in a step has the effect to change its state from not started through started to finished. Some of these changes of state may lead to an event, and for steps being started through the presentation block (A) by a click of a mouse in a browser, the event "OnClick" may be created (1a). If a step contains a reference to an interview, the control is passed on to the assessment system (1b).

Figure 6:
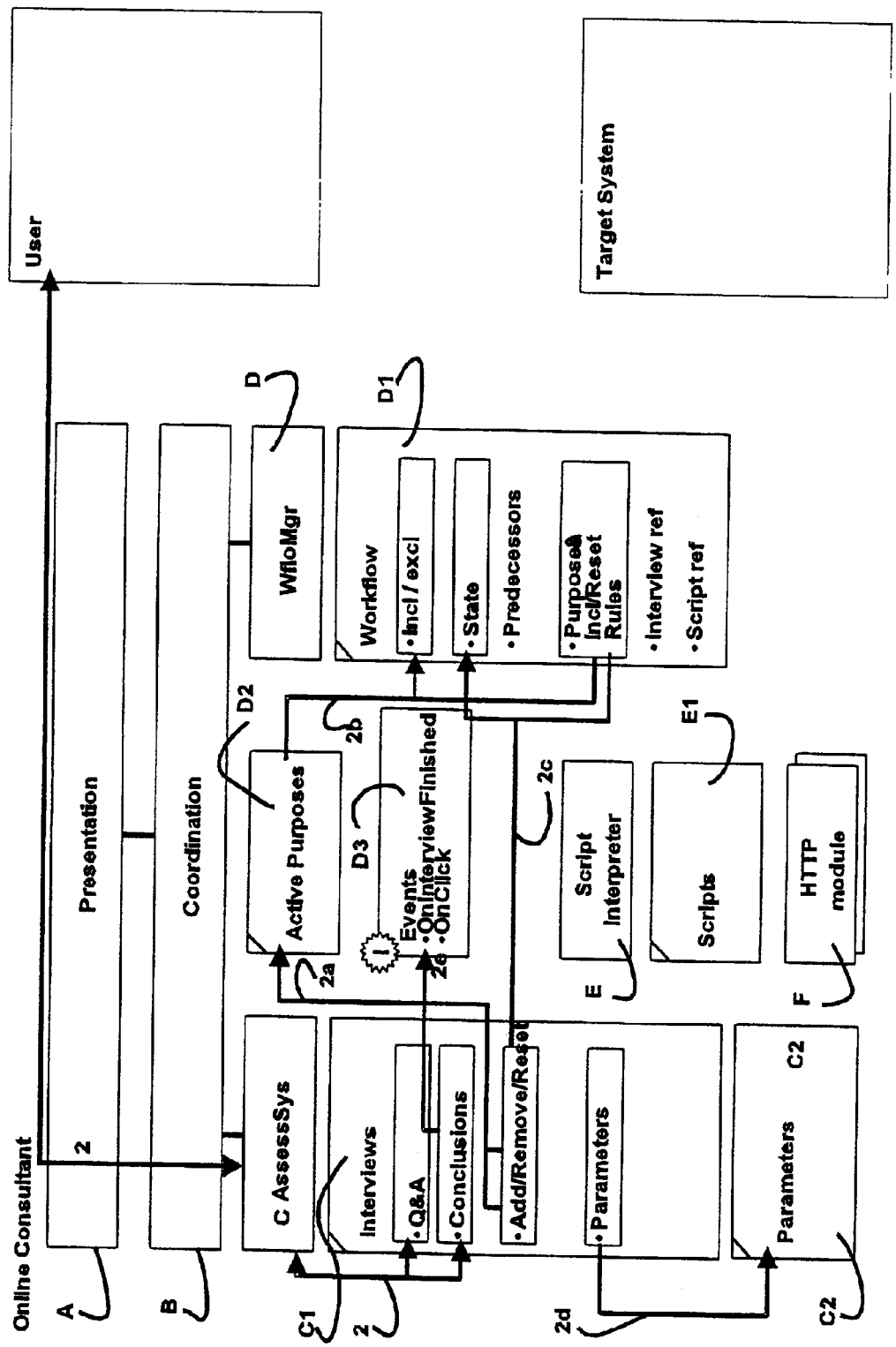
FIG. 6 shows the interview system component and assessment system component of the system.

FIG. 6 shows how the assessment or interview is carried out. Questions are deduced from the assessment inference data and presented to the user, and answers trigger which question to ask next, until the assessment comes to a conclusion (2). This conclusion of the assessment is associated with a number of purposes to, respectively, add, remove, or reset (2a), (2b), and (2c). Add meaning adding them to the list of active purposes (D2), remove meaning removing them from the list (2a), such that applying the inclusion rules each step of the workflow in the workflow database (D1), it is determined whether the step is included or excluded from the workflow (2b), and reset meaning resetting the state of all steps having the purpose(s) in question as one of the purposes assigned to the step from whatever they may be to "not started" (1c). Like with inclusion rules, reset rules may apply for each step to determine in which situation its state is reset. A typical and simple inclusion rule (and reset rule) is the OR rule: if either of the purposes assigned to a step is in the list of active purposes, the step will be included in the workflow, otherwise it is excluded (and similarly, if either of the purposes is reset, the step will be reset, i.e. its state set to "not started").

Figure 7:
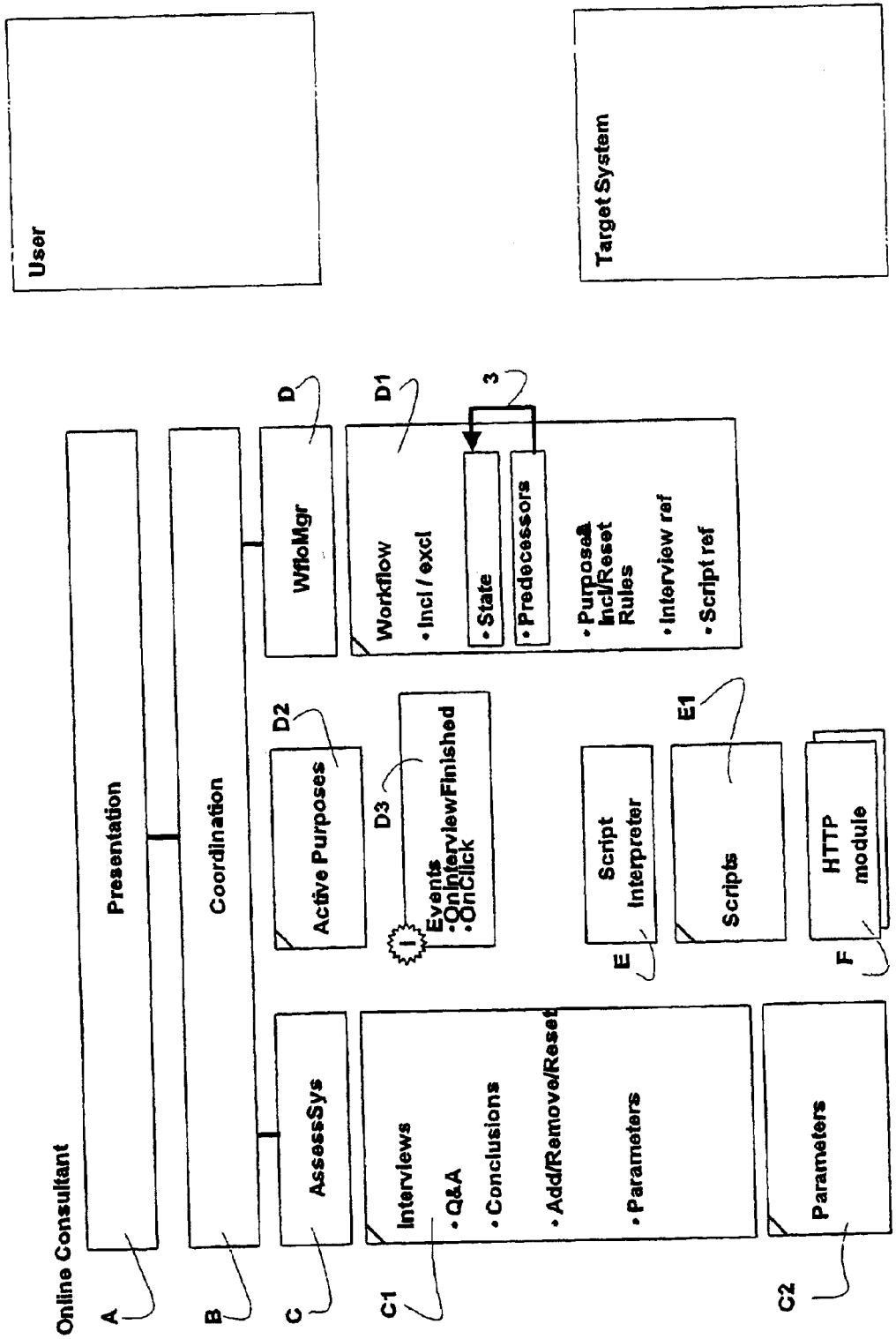
FIG. 7 shows the system for preserving predecessors.

FIG. 7 shows how the workflow-manager (D) preserves the predecessor rules immediately after an assessment (3). If as a consequence of the assessment, changes to the workflow have been carried out, which bring about a situation, where steps with a state different from "finished" have become predecessors to steps with a state different from "not started", then the latter steps must be reset, i.e. their state set to "not started". This may happen if, either, according to FIG. 6, a step is added to the workflow, where said step is a predecessor to another step, which had been started or finished, or, a step has been reset through one of its assigned purposes being reset, said step being a predecessor to another step, which had been started or finished.

Figure 8:
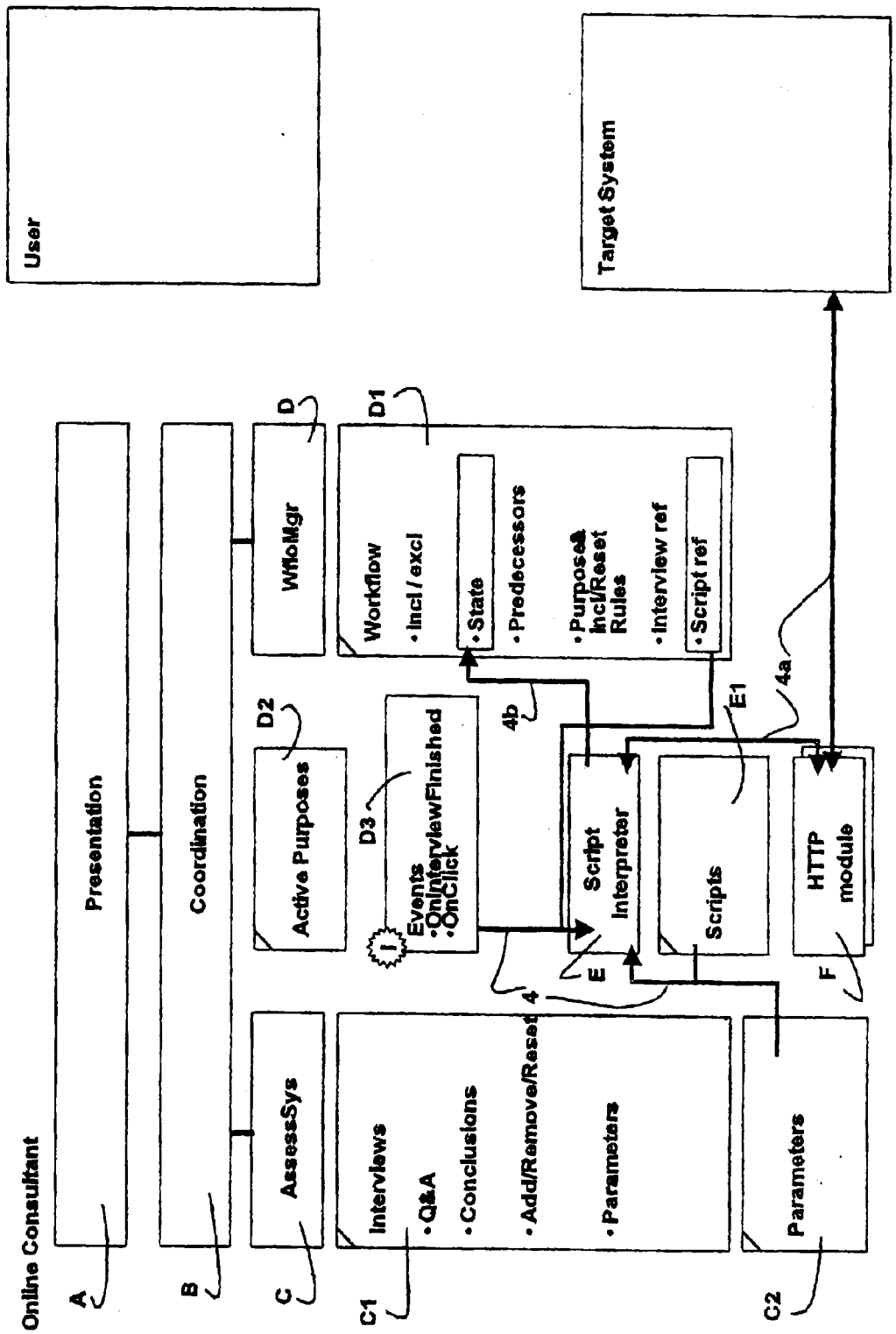
FIG. 8 shows the system for running scripts.

FIG. 8 shows how scripts are activated through events listed in the list of events (D3). If a step has a script associated (indicated as a script reference in the step), the events from the step may trigger the script to execute (4) taking the parameters in the parameter database (C2) as input to the execution. The script has a procedure for each event it is designed to react on, e.g. an "OnInterviewFinished" procedure, which is executed when an assessment finishes and creates the corresponding event, and an "OnClick" procedure, which is executed, when a step is started by the click of a mouse carried out by the user and communicated through the presentation block (A) to the Coordination block (B). A script execution being carried out by the script interpreter (E) may make calls to external modules (4a) such as an HTTP module (F) for making calls via the Internet to remote external systems, e.g. target systems installed on a second server for the workflow to configure or troubleshoot.

Figure 9:
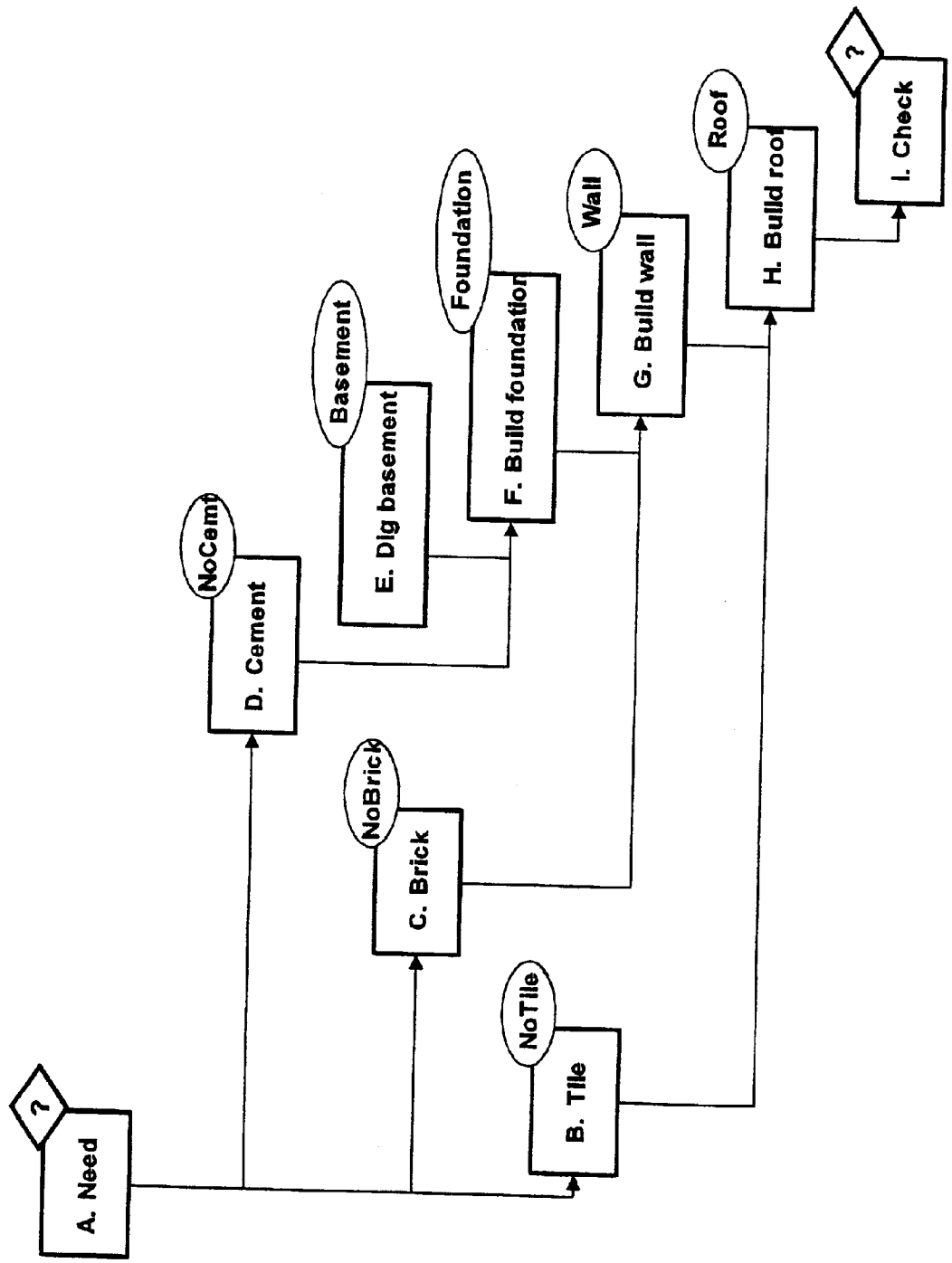
FIG. 9 shows an exemplary workflow.
Figure 10:
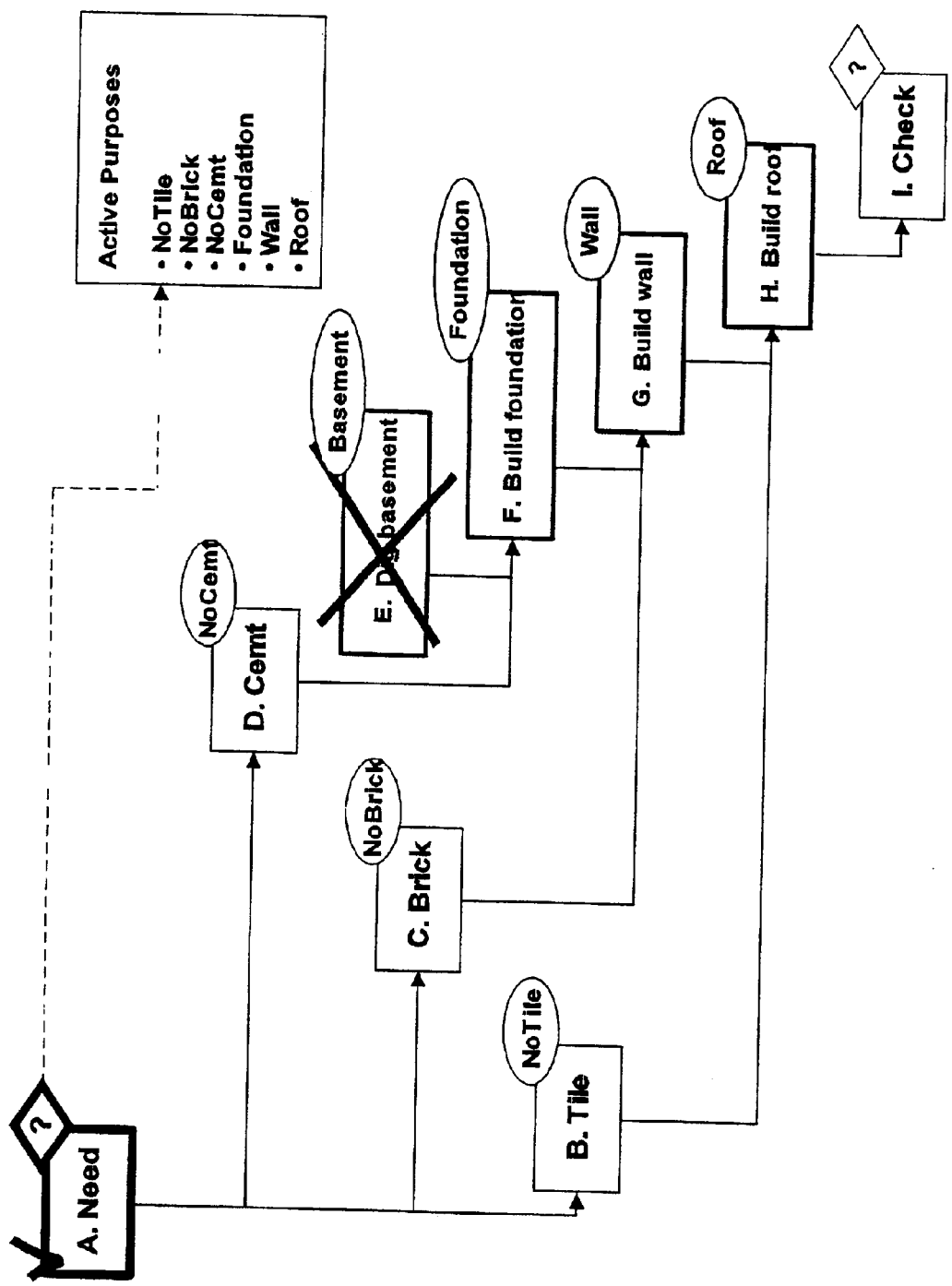
FIG. 10 shows a step through an exemplary workflow according to the invention and using the assessment system to update the workflow.
Figure 11:
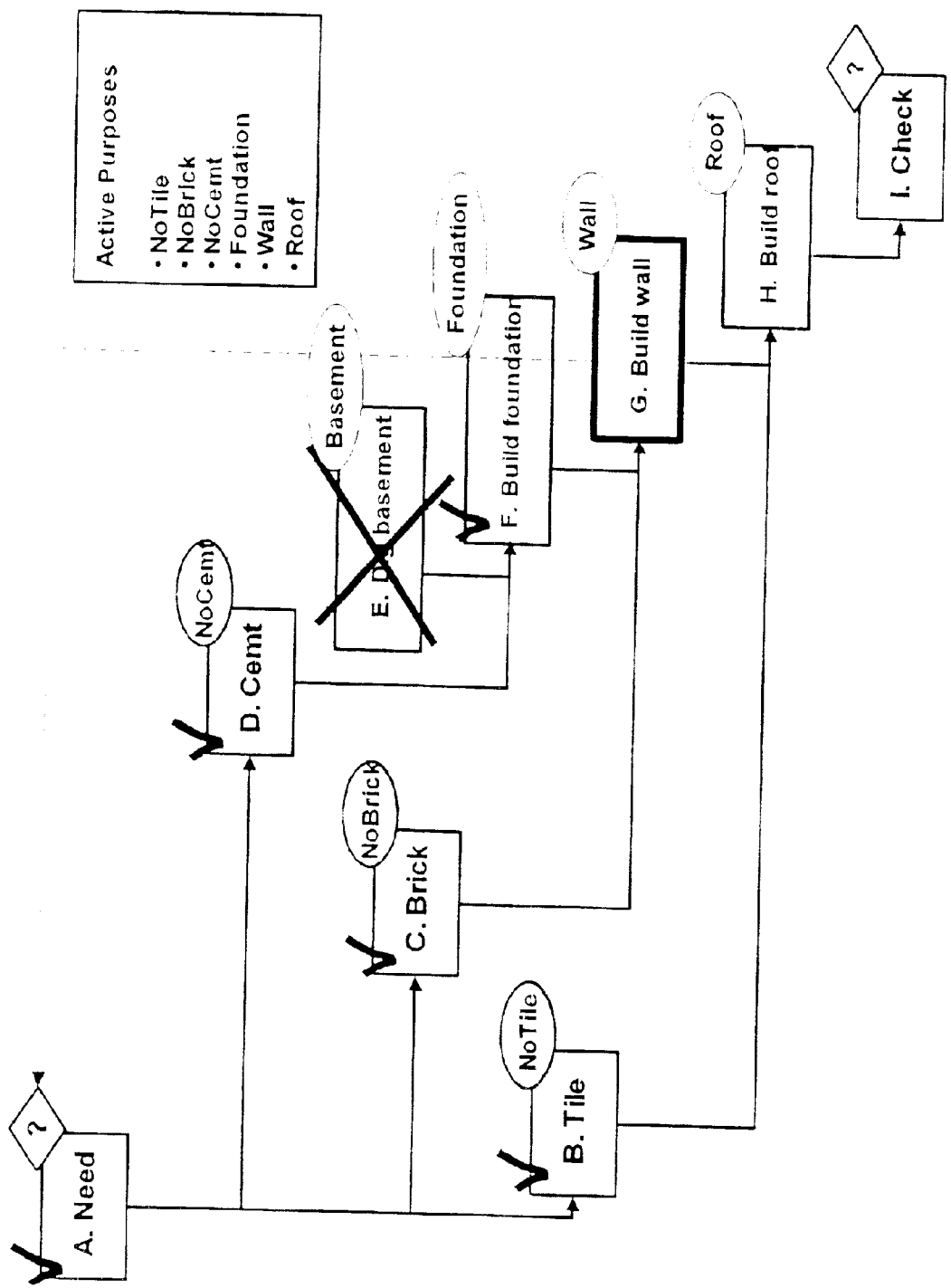
FIG. 11 shows a step through an exemplary workflow according to the invention and using the workflow-manager to progress through the workflow.
Figure 12:
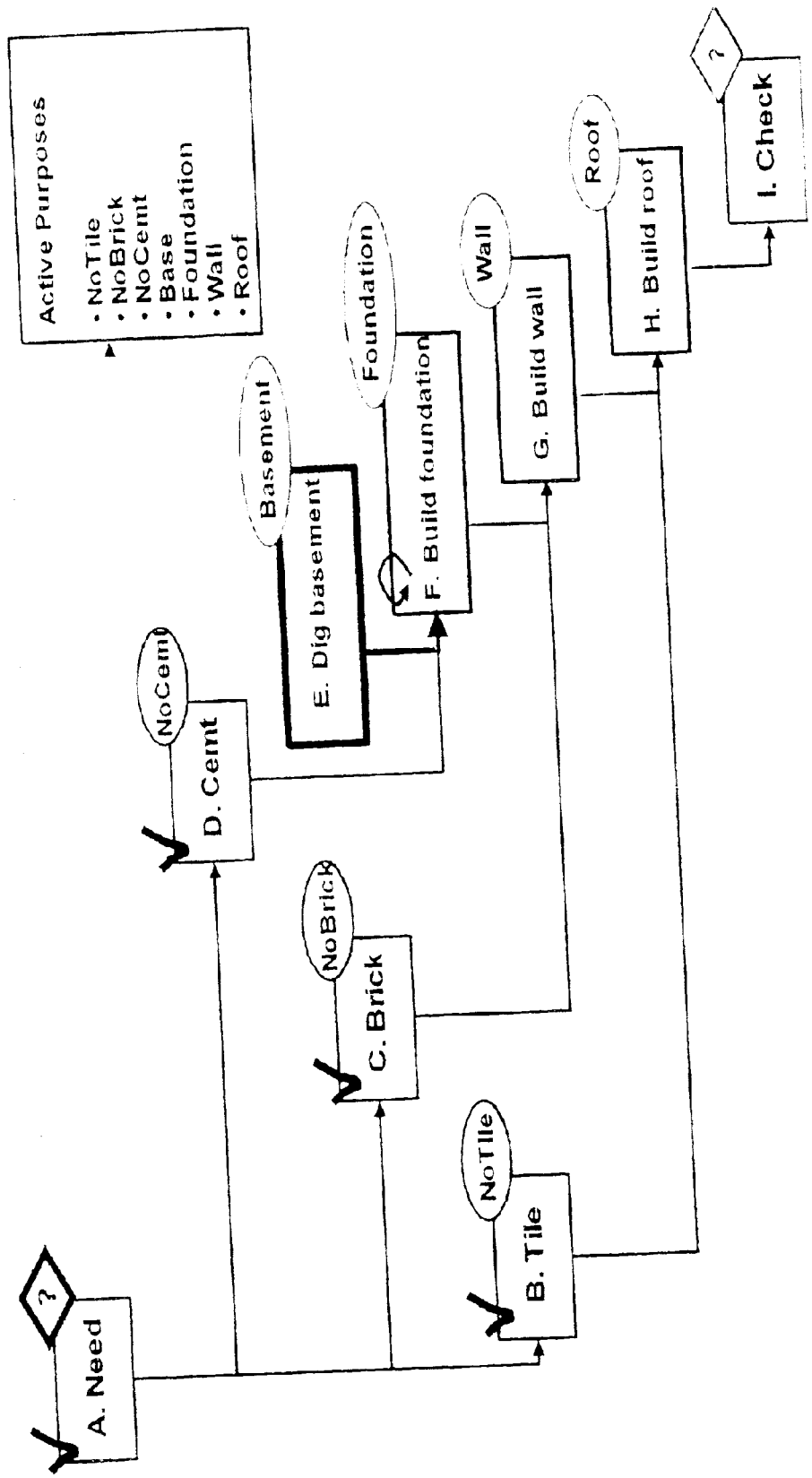
FIG. 12 shows a step through an exemplary workflow according to the invention and using the assessment system and workflow manager to update the workflow by adding a purpose and preserving predecessors.
Figure 13:
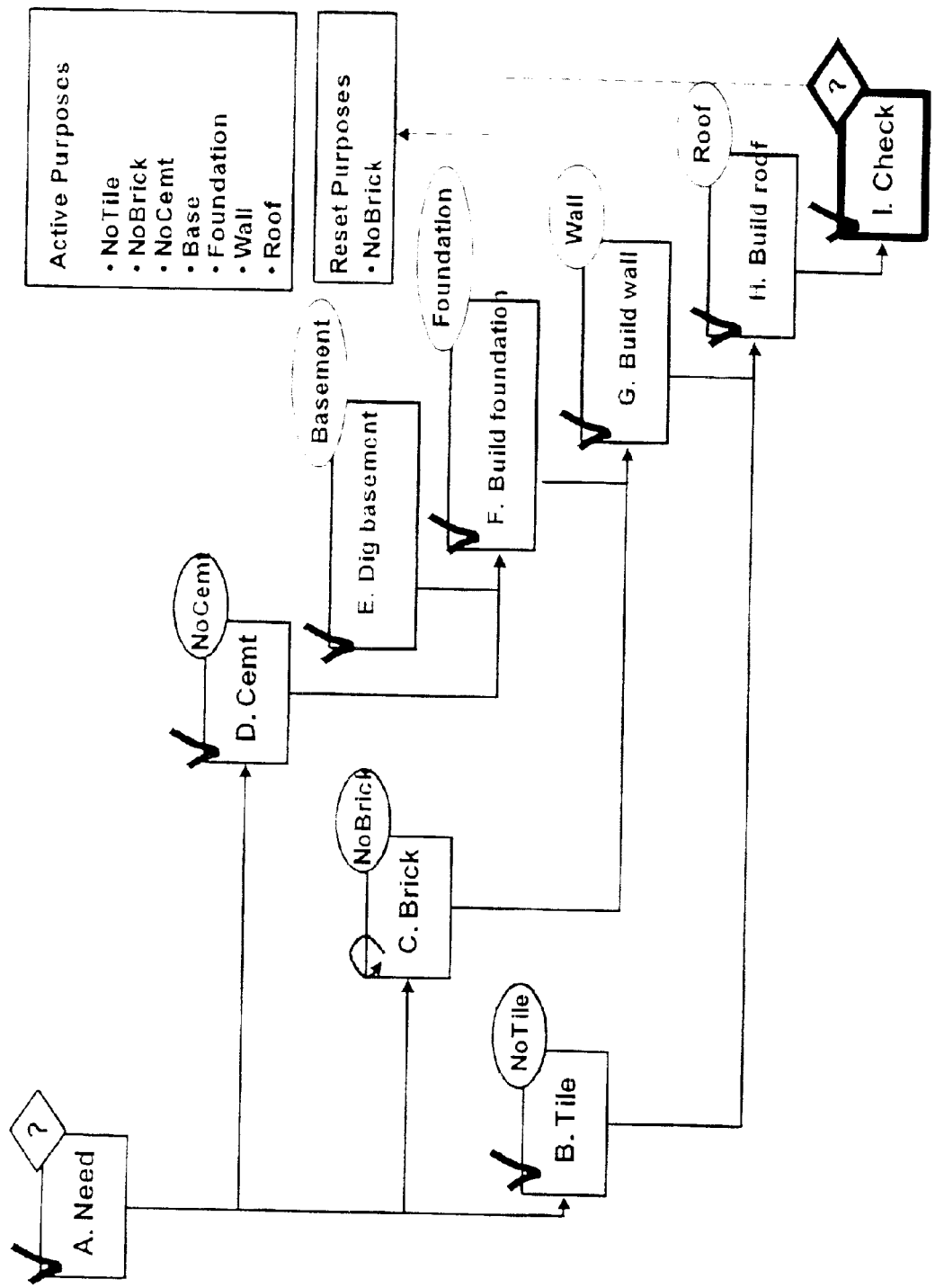
FIG. 13 shows a step through an exemplary workflow according to the invention and using the assessment system to update the workflow by resetting a purpose.
Figure 14:
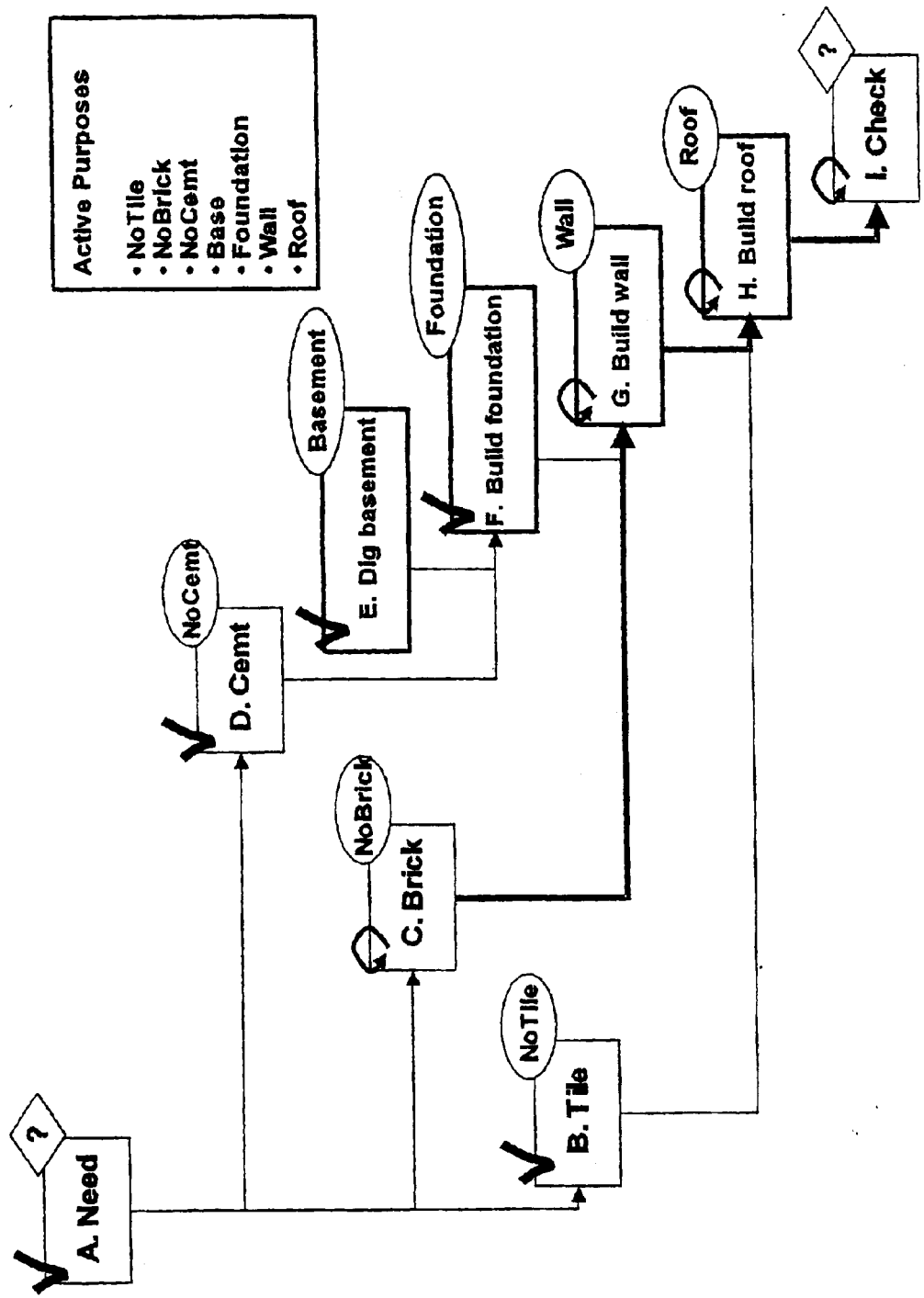
FIG. 14 shows a step through an exemplary workflow according to the invention and using the workflow-manager to update the workflow by preserving predecessors.

The remaining FIGS. 9, 10, 11, 12, 13 and 14 are a practical example of how the assessment system changes a workflow when an addition of an extra element is added and then finishes the workflow. The example comprises the task of building of a house, with the steps buying cement (D), buying bricks (C), buying tiles (B), making foundation (F), making walls (G), making roof (H) and ending with a check (I) that the whole process ended as planed. After the foundation is made, the additional step of digging a basement (E) is added. The first box is a need box (A), which bears the reference to the interview (shown as a rhomb with a question mark), which is carried out by the assessment system, for determining what should be done. The purposes associated with the steps are indicated by either a rhomb or an ellipse attached to the boxes indicating a step of the workflow. The example is not very complicated and FIG. 9 shows how intuitively the workflow would be, where the foundation should be finished before the walls and the roof is the last thing to finish. Following is a description of how the system would come to the same conclusion. As was shown above in connection with the description of FIG. 1, the first step of running through the flowchart after starting is usually an interview. This is the need box (A). During this step, the user indicates that he desires to build a house without basement. The assessment system assumes a generic house and includes the purposes NoCemt, NoBrick, NoTile in the list of active purposes, but excludes the purpose Base. The steps, foundation, wall and roof contain no particular purpose, because these are always needed to construct the house (they are always added to the workflow for building a house). The cement (D) is necessary to build foundation (F) and is therefore a predecessor for the build foundation (F). The same way, build foundation (F) and bricks (C) are predecessors for build walls and Tiles (A) and build walls (G) are predecessors for build roof (H). Finally, the check (I) cannot be made before all predecessors are finished. Assuming that the workflow has progressed to the point where build foundation (F) has run its course and the next step would be build wall (G) as shown in FIG. 11. At this point the user wishes to make the addition of a basement to the house through repeating the need interview as indicated by the dashed line returning to the need box (A). The assessment system adds the basement to the list of active purposes, which causes the step of dig basement (E) to be included in the workflow as shown in FIG. 12. The steps cement (C) and dig basement (E) are now both predecessors to build foundation (F) and because dig basement (E) is not finished, build foundation (F) must be reset as indicated by the curved arrow in FIG. 12. The step of build foundation (F) must then be remade after the basement has been dug. Finally, as indicated in FIG. 13, the last step of the workflow is a check (I). In this example, it is found that the bricks that were used for the walls are inadequate, so the purpose NoBrick is reset, so that the step of buying bricks (C) is reset to not started and must be repeated. This has the consequence that the steps for which brick (C) is a predecessor must also be reset as shown in FIG. 14. The workflow is completed when all the steps are marked as finished and no purposes are reset.

It is obvious to a person skilled in the arts that the above example by no means encompasses the full scope of the invention. Notably, the aspects of (1) applying inclusion and reset rules when determining which steps to add, remove and reset, based on the list of active purposes and the number of purposes reset by the assessment system and (2) differentiating the notion of predecessors into sequence predecessors and logical predecessors, the former determining which steps are allowed to start, and the latter determining which steps to reset upon a change in the workflow are encompassed by the invention. The example was chosen because of its simplicity. The invention may easily be adapted, as was shown in connection with FIG. 3, to act as a configuration expert for setting up application programs on remote systems, dynamic workflow-managers, wizards, diagnostics systems or nearly any task where a coordination of knowledge and tasks has to work together in a structured way.

What is claimed is:

1. A method for generating a workflow on a computer for guiding a user through a sequence of activities, said method comprising the steps of:
   obtaining assessment data from the user, said assessment data defining a need, problem, state, or desired change of state,
   creating a workflow based on said assessment data using an assessment system, said workflow describing a logical sequence of interdependent steps to be performed to complete said task, each step having a start and a finish, which may be coincidental, and
   presenting said user for one or more of said workflow steps in a logical order,
   wherein said workflow is modified by:
   gathering results from the progress of each of said one or more steps,
   modifying, if needed, the structure of said workflow using said assessment system, sub-solutions, logic rules, inference rules and said results by adding and/or removing steps to/from said workflow based on a list of purposes and knowledge of the order in which some or all steps must be executed, and
   continuing through said workflow starting the next one or more unfinished steps which is not dependent on an unfinished step as a sequence predecessor, thereby forming an adaptive procedure.

2. A method according to claim 1, wherein the workflow is displayed and where the user may add/remove steps or sequences of steps to/from the workflow via conclusions, thus allowing the user to investigate the consequences of these changes or allowing the user to update the task, thereby forming an iterative procedure.

3. A method according to claim 1, wherein additional problem information, need information, status information and change information is gathered in the form of additional action data specific to each of the said one or more steps of said workflow, which were not required to set up said workflow initially.

4. A method according to claim 1, wherein said steps of the modified workflow already finished may be marked as unfinished or not started due to the update of the workflow, because they depend on unfinished steps as logical predecessors, which have been included in the workflow or reset as a part of said modification.

5. A method according to claim 4, wherein one or more steps of the workflow is changed from finished to unfinished, where the information contained in the steps either are cleared or at least a part of it is reused.

6. A method according to claim 1, wherein a step removed by a previous modification of said workflow and later added again by a new modification may retain some or all information already gathered for that step, and possibly keeping the step in the state it was at the time of said removal (e.g. started or finished).

7. A method according to any of the claims 1 to 6, wherein said steps of said workflow are only in the form of questions and said results are only in the form of answers, where the structure of said workflow is modified using said assessment system based on said answers and where the method becomes an interactive questionnaire and the result from going through all said steps of said workflow outlines a need for a product or service.

8. A method according to claim 1, wherein a step of said workflow may be marked as finished or unfinished depending on the time at which one or more steps are started or finished or simply by the distance in time to one or more times and/or dates.

9. A method according to claim 1, wherein said workflow may be modified depending on the time at which one or more steps are started or finished or simply by the distance in time to one or more times and/or dates.

10. A method according to claim 1, wherein a step of said workflow has or requires resources comprising personnel, equipment, time, money, space, knowledge and other which may be swapped between one step and another, depending on the status of said one or more steps.

11. A method according to claim 1, wherein a step of said workflow cannot, if required, be started and/or finished until a sworn statement of cohabitation accepting or approving said results of said step, creating an electronic signature or any other method for approving or accepting an action has been performed and the results are as stated.

12. A method according to claim 1, wherein a step of said workflow may involve a purchase of a product, service or manpower.

13. A method according to claim 1, wherein said user is accepting a specific product, company or service to interact with his local configuration and programs and thereby enabling the combination of the workflow-manager and assessment system to work as an automated maintenance system doing changes in configuration and installing/de-installing programs.

14. A computer system for generating a workflow and comprising:
one or more data files containing assessment and assessment inference data outlining a problem to be solved or a need to be fulfilled,
a database containing data on one or more solutions or methods to a vast number of smaller tasks within a specific defined technical field,
a workflow manager capable of keeping track of steps comprising an activity and ensuring that the steps are carried out in a not wrongful order and where more than one step may be in progress at the same time, and
an assessment system capable of creating one or more data files containing a workflow based on said data file, using said database,
wherein said one or more data files containing said workflow is modified by the assessment system,
said workflow-manager is keeping track of said steps outlined in said one or more data files outlining said workflow,
the progress of said steps of said one or more data files outlining said workflow is monitored and one or more data files containing data on said progress of said workflow and results from said progress of said workflow is created or updated, and
said assessment system using said one or more data files outlining said progress and said results from the workflow is modifying said one or more data files containing the workflow using sub-solutions, logic rules and inference rules continuing through said workflow starting the next one or more unfinished steps which is not dependent on an unfinished step as a sequence predecessor, thereby forming an adaptive procedure.

15. A system according to claim 14, wherein the workflow-manager and assessment system are installed on a first server.

16. A system according to claim 15, wherein said first server is connected to the Internet or any other interconnected computer network, wired or wireless.

17. A system according to claim 16, wherein said system enables a user computer to be connected to said first server through the Internet or any other interconnected computer network, wired or wireless using a computer and a program installed in the computer, like an Internet browser or similar or a program specially written to communicate with said first server, where the system acts as an Online Consultant service.

18. A system according to claim 17, wherein the user is a third server running an application or service on top of said Online Consultant service, e.g. in the form of using the Online Consultant service as a web service provided via the Internet.

19. A system according to claim 17, wherein said user computer has installed software and/or hardware that continually or occasionally require an update or change of configuration.

20. A system according to claim 15, wherein said server has installed a program like Common Gateway Interface (CGI), Active Server Pages (ASP) or similar for transferring information between said first server and the Internet or any other interconnected computer network, wired or wireless using a markup language to communicate between the user and the server.

21. A system according to claim 15, wherein one or more other second servers are connected to the Internet or any other interconnected computer network, wired or wireless and may communicate with said first server and/or said user computer.

22. A system according to claim 21, wherein said one or more other second servers have installed software and/or hardware that continually or occasionally require an initiation/configuration, update or change of configuration.

23. A system according to one or more of claims 15–19, wherein said one or more data files containing action data, said database containing data on one or more solutions or methods to a vast number of tasks within a specific narrowly defined technical field, said workflow-manager, said expert system, said Internet browser, said CGI or ASP, said software and said hardware is installed on the same computer and where all activities are displayed on that computer alone.

* * * * *